Nov. 22, 1955   H. E. TAUTZ   2,724,748
MEANS FOR VARYING THE CIRCUMFERENTIAL RELATION
BETWEEN A DRIVE AND A DRIVEN SHAFT
Filed April 6, 1953
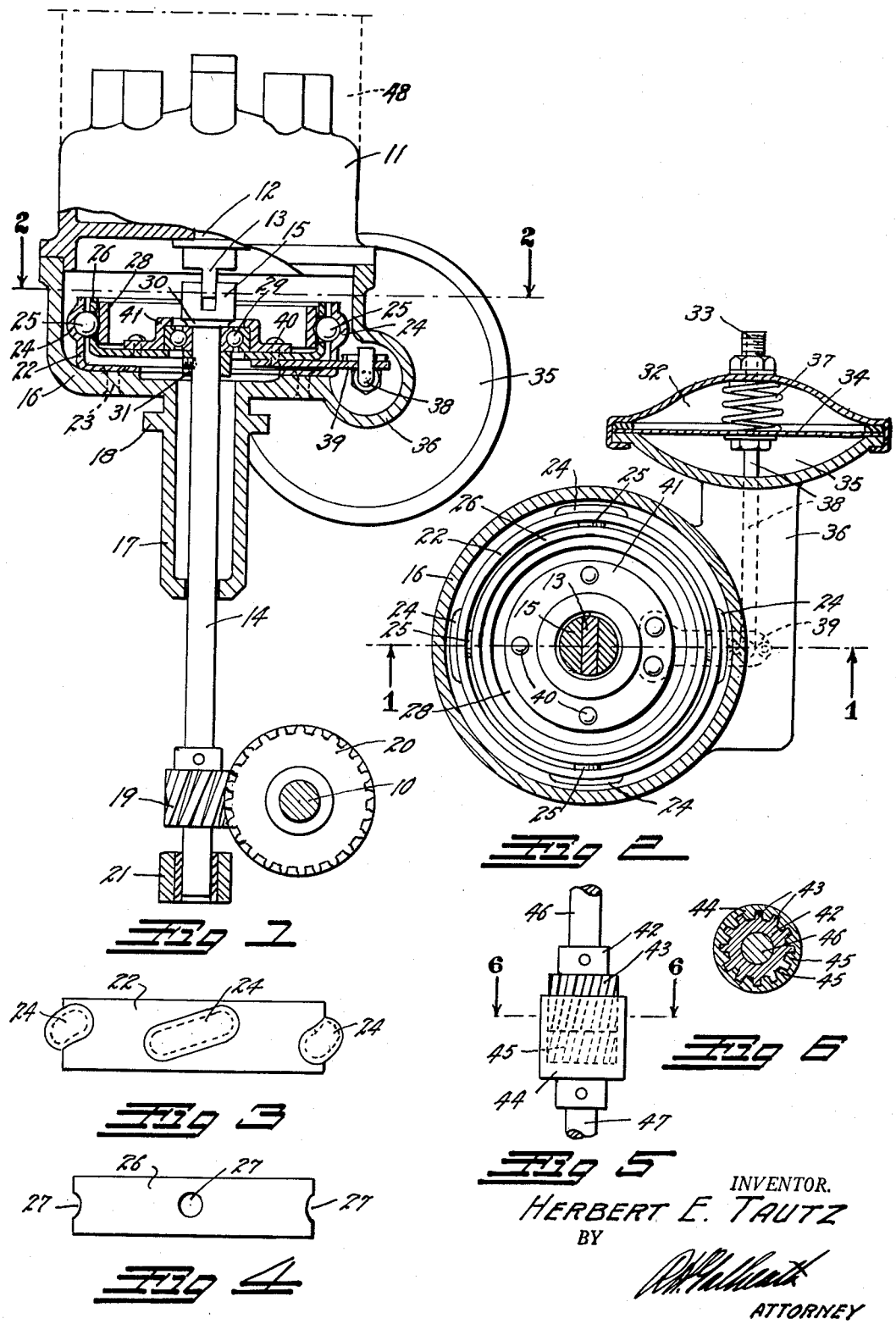
INVENTOR.
HERBERT E. TAUTZ
BY
ATTORNEY

United States Patent Office 2,724,748
Patented Nov. 22, 1955

2,724,748

MEANS FOR VARYING THE CIRCUMFERENTIAL RELATION BETWEEN A DRIVE AND A DRIVEN SHAFT

Herbert E. Tautz, Denver, Colo., assignor to Heckethorn Manufacturing & Supply Company, Littleton, Colo., a corporation of Colorado Application April 6, 1953, Serial No. 346,841

8 Claims. (Cl. 200—31)

This invention relates to a mechanism for changing the relative position of two rotating members during the rotation of the latter and is more particularly applicable for advancing or retarding the ignition timing of internal combustion engines. It is, however, not limited to the latter use as it will be found valuable wherever it is desired to change the circumferential relation between a driven shaft and a drive shaft for any desired purpose.

The principal object of the invention is to provide a positive and highly efficient device which will have a minimum of working parts and which will positively and accurately control the relative circumferential positions of two connected rotatable shafts.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a side view, partially in section, illustrating the improved mechanism for changing the relative position between two shafts applied to the distributor of an internal combustion engine;

Fig. 2 is a cross section, taken on the line 2—2, Fig. 1;

Fig. 3 is a detail view illustrating a ball race member employed in the invention;

Fig. 4 is a similar detail view illustrating a ball cup member employed in the invention;

Fig. 5 is a fragmentary, detail view illustrating an alternate form of relation shifting mechanism which may be employed in the invention; and Fig. 6 is a cross-section through the alternate form, taken on the line 6—6, Fig. 5.

The illustrated embodiment of the invention discloses its use between a cam shaft and distributor of an internal combustion engine. It is understood that this specific use is for illustrative purposes only.

In the drawing, the cam shaft is indicated at 10 and the conventional ignition distributor is indicated at 11. The distributor may be any of the conventional types designed to close a circuit to create a spark in the cylinder of an internal combustion engine at the proper time for igniting the propelling gases therein.

All distributors are constructed about a distributor shaft 12. For the uses of this invention, the shaft 12 is provided with a male coupling member 13 which is axially movable in a female coupling member 15 mounted on the extremity of a driven shaft 14 which is axially aligned with the distributor shaft 12 and slidably mounted in a guide bearing 21.

As illustrated, the distributor 11 is supported on a mechanism housing 16 having a tubular extension 17 which is designed to fit into a distributor socket of an internal combustion engine and which is provided with a stop flange 18 which rests upon the engine to support the housing 16 of the distributor 11 thereon. In certain types of engines, the driven shaft 14 is provided with a helical-toothed pinion 19 which is in constant mesh with a helical-toothed gear 20 mounted on the cam shaft 10. Thus, it can be seen that the rotation of the cam shaft 10 will be transmitted through the helical gear 20 and the helical pinion 19 to the shaft 14 thence through the coupling members 15 and 13 to the shaft 12 of the distributor 11.

The object of this invention is to advance or retard the circumferential position of the shaft 14 relative to the circumferential position of the shaft 10. The above result is accomplished by simply shifting the axial position of the shaft 14 causing the teeth of the helical pinion 19 to slide on the inclined teeth of the helical gear 20 so as to rotate the shaft 14 either forwardly or rearwardly.

The axial shifting of the shaft 14 may be accomplished in many ways. One way is illustrated in Figs. 1 to 4 of the drawings in which a cup-shaped ball race member 22 is fixedly mounted in the housing 16 concentrically of the shaft 14. The ball race member 22 may be retained in the housing in any desired manner, such as by means of attachment rivets 23. The ball race member is provided with a plurality of relatively short, outwardly-indented, inclined ball races 24 in each of which a retaining ball 25 is positioned. A ball retaining cup 26 is positioned within the enclosure of the ball race member 22 and the latter cup is provided with ball sockets 27 in which the balls 25 are carried.

The radial thrust of the balls 25 is received on an internal, circular ball race member 28 free to rotate within the cup 26. The cup 26 is rotatably mounted on the shaft 14 through the medium of anti-friction thrust bearings 29 mounted in a bearing retainer 41 secured to the cup 26. The bearings 29 are positioned between a shoulder 30 on the shaft 14 and a set collar 31 fixed on the shaft to prevent longitudinal movement of the cup 26 on the shaft 14.

It can be seen that if the cup 26 be rotated back and forth, the balls 25 will roll up and down the inclined ball races 24 causing the shaft 14 to be moved upwardly and downwardly. This upward and downward movement of the shaft 14 causes the inclined helical teeth of the pinion 19 to slide along the teeth of the gear 20 so as to advance or retard the circumferential position of the shaft 14 relative to the circumferential position of the shaft 10.

The rotation of the cup 26 may be accomplished in any desired way. As illustrated, it is accomplished in consequence of the variations in the vacuum of the intake manifold of the internal combustion engine. A vacuum chamber 32 is connected through a suitable tubing nipple 33 with the intake manifold of the engine. One wall of the vacuum chamber comprises a suitable flexible diaphragm 34 mounted on a bowl-shaped portion 35 formed in a tubular extension 36 of the housing 16. Atmospheric pressure in the bowl-shaped portion 35 acts to urge the diaphragm in one direction and a compression spring 37 acts to urge the diaphragm in the opposite direction. A connecting rod 38 is secured to and projects from the diaphragm 34 and connects with a lever arm 39 which is secured to the cup 26 by means of rivets 40 or in any other desired manner.

It can be seen that the vibrations of the diaphragm will be communicated through the above described mechanism, to the cup 26 to rotate the latter to cause axial movement of the shaft 14 to create the relative circumferential movement above described.

In engines which do not employ helical gears, the same result can be accomplished by the means illustrated in Figs. 5 and 6. The latter means comprise a male shaft coupling member 42, provided with external, helical teeth 43, which is slidably fitted into a female coupling member 44 provided with internal helical teeth 45 which are intermeshed with the teeth 43.

The male coupling member is mounted on a distributor shaft indicated at 46, and the female coupling member 44 is mounted on a drive shaft 47. The shaft 46 corresponds to the shaft 14 previously described, and the shaft 46 can be shifted longitudinally by means of the shifting mechanism of Figs. 1 and 2 or in any other desired manner.

It can be seen that longitudinal shifting movement of the shaft 46 will change the relative circumferential positions of the two shafts 46 and 47 due to the helical incline of the intermeshed teeth 43 and 45.

While, for the sake of illustration only, the invention has been applied to a conventional ignition distributor, it is more particularly applicable for advancing the drive shaft of an electro-static generator of the type proposed for use on internal combustion engines to replace the present induction type of current supply for ignition purposes. Such generators are hermetically sealed under pressure so that access for shifting purposes is difficult, if not impossible. Such a generator would replace the distributor 11 and occupy the position indicated in broken line at 48. Access to the generator would not be necessary with the use of this invention since the shifting or advancing would be accomplished by simply retarding the circumferential position of the generator shaft similarly to the manner in which the distributor shaft 12 is retarded or advanced in the illustrated embodiment.

While a specific form of the improvement has been described and illustrated herein, it is to be understood that the same may be varied, within the scope of the appended claims, without departing from the spirit of the invention.

Having thus described the invention, what is claimed and desired to be secured by Letters Patent is:

1. A device for advancing the circumferential position of a driven shaft relative to a drive member comprising: an actuating member; means cooperating with said actuating member acting to impart axial movement to said driven shaft; and gear drive means between said driven shaft and said drive member, said gear drive means being of an inclined tooth type so that the incline of said teeth will act to advance the circumferential position of said driven shaft relative to said drive member in consequence of the axial movement of said driven shaft.

2. A device for advancing the circumferential position of the shaft of a distributor of an internal combustion engine comprising: a driven shaft, an actuating member acting to impart longitudinal movement to said driven shaft, a toothed drive member driving said driven shaft the teeth of said drive member being inclined so as to act to advance the circumferential position of said driven shaft in consequence of its axial movement; and means for transmitting the rotational movements of said driven shaft to said distributor shaft.

3. A device for advancing the circumferential position of the shaft of a distributor of an internal combustion engine comprising: a driven shaft; an actuating member rotatably mounted and longitudinally fixed on said driven shaft; an inclined member cooperating with said actuating member acting to impart longitudinal movement to said driven shaft in consequence of the rotation of said actuating member; a toothed drive member driving said driven shaft the teeth of said drive member being inclined so as to act to advance the circumferential position of said driven shaft in consequence of its axial movement; and means for transmitting the rotative movements of said driven shaft to said distributor shaft.

4. A device for advancing the circumferential position of the shaft of a distributor of an internal combustion engine comprising: a cam shaft; a driven shaft; an actuating member; means cooperating with said actuating member acting to impart axial movement to said driven shaft; power transmission means connecting said cam shaft and said driven shaft and acting to advance the circumferential position of said driven shaft relative to said cam shaft in consequence of axial movement of said driven shaft; and means for communicating the rotative movements of said driven shaft to the distributor shaft.

5. A device for advancing the circumferential position of the shaft of a distributor with respect to the cam shaft of an internal combustion engine comprising: a driven shaft; an actuating member rotatably mounted on said driven shaft; means preventing the axial movement of said actuating member with respect to said driven shaft; an inclined member cooperating with said actuating member to impart axial movement to said actuating member and said driven shaft in consequence of the rotation of said actuating member; power transmission means connecting said cam shaft and said driven shaft; inclined teeth in said power transmission means acting to advance the circumferential position of said driven shaft in consequence of its axial movement; means for rotating said actuating member; and means for transmitting the rotation of said driven shaft to said distributor shaft.

6. A device for advancing the circumferential position of the shaft of a distributor with respect to the cam shaft of an internal combustion engine comprising: a longitudinally shiftable driven shaft interposed between said cam shaft and said distributor shaft; an actuating member rotatably mounted on said driven shaft and provided with a ball socket; means preventing axial movement of said actuating member with respect to said driven shaft; a fixed ball race member; an inclined ball race in said race member disposed at an angle with respect to the plane of rotation of said actuating member; a ball interposed between said ball socket and said inclined ball race and acting to impart axial movement to said actuating member and through it to said driven shaft in consequence of the rotation of the actuating member; helical gears transmitting power from said cam shaft to said driven shaft, the incline of the teeth of said gears acting to advance the circumferential position of said driven shaft in consequence of axial movement of its helical gear relative to the helical gear on said cam shaft; means for rotating said actuating member; and means for transmitting the rotation of said driven shaft to said distributor shaft.

7. Means for advancing and retarding the ignition timing of an internal combustion engine comprising: an ignition distributor; a distributor shaft actuating said distributor; a driven shaft positioned in axial alignment with said distributor shaft; means transmitting rotation from said driven shaft to said distributor shaft while allowing relative axial movement therebetween; a toothed driven member mounted on said driven shaft; a toothed driving member in mesh with said driven member, the teeth of said latter members being inclined to the axes thereof so that longitudinal movement of said driven shaft will cause a rotative movement thereof; and means for moving said driven shaft longitudinally.

8. Means for advancing and retarding the ignition timing of an internal combustion engine as described in claim 7 in which the means for moving said driven shaft longitudinally comprises: a fixed, annular, cup-shaped ball race member concentrically surrounding said driven shaft; a plurality of inclined ball races indented in the inner wall of said ball race member; a ball-retaining cup positioned within said race member; ball-retaining indentations formed in the outer wall of said cup; a ball positioned between each ball race and the adjacent indentation so that rotation of said cup will cause said balls to follow the inclines of said races to move said cup longitudinally of the axis of said driven shaft; a bearing rotatably mounting said cup on said driven shaft; and means preventing longitudinal movement of said cup on said driven shaft.

References Cited in the file of this patent

UNITED STATES PATENTS

| | | | |
|---|---|---|---|
| 809,560 | Graham et al. | Jan. | 9, 1906 |
| 1,144,135 | Kaisling | June 22, 1915 |
| 1,457,462 | Riker | June 5, 1923 |
| 1,785,902 | Hardman | Dec. 23, 1930 |
| 1,792,072 | Chryst | Feb. 10, 1931 |